3,054,759
POLYURETHANE PRODUCTION WITH THORIUM SALTS AS CATALYSTS
J W. Britain, New Martinsville, W. Va., assignor to Mobay Chemical Company, Pittsburgh, Pa., a corporation of Delaware
No Drawing. Filed Mar. 17, 1960, Ser. No. 15,524
9 Claims. (Cl. 260—2.5)

This invention relates generally to catalysis of chemical reactions, and more particularly, to a method for modifying the reaction rate of an organic compound having reactive hydrogen atoms and an organic isocyanate or isothiocyanate.

It has been proposed heretofore to include a tertiary amine in a reaction mixture containing compounds having reactive hydrogen atoms and organic isocyanates or isothiocyanates. Tertiary amines accelerate the reaction between an —NCO group and a primary hydroxyl group such as those found on polyesters prepared by condensing an excess of a polyhydric alcohol with a polycarboxylic acid. Metallic alcoholates and soaps have also been proposed in U.S. Patent 2,846,408 as catalysts for the reaction between such a polyester and a polyisocyanate or polyisothiocyanate. Although such catalysts can be used to advantage in preparing polyurethane plastics from polyesters and various other compounds having reactive hydrogen atoms when the reactive hydrogen atom is contained in a primary hydroxyl group, it is more difficult and sometimes impossible to effect reaction between a compound having secondary hydroxyl groups and a polyisocyanate at a sufficient rate for use in production of such plastics. Often, it is necessary to use elevated temperatures for such a reaction when the catalyst is a tertiary amine. Moreover, it is usually necessary to use an aromatic polyisocyanate because the tertiary amine catalysts heretofore available do not materially accelerate the reaction rate between an aliphatic isocyanate and a reactive hydrogen atom. This is true even when the hydrogen atom is contained in a primary hydroxyl group.

It is therefore an object of this invention to provide a catalyst system which is not only useful for catalyzing the reaction between a reactive hydrogen of a primary hydroxyl group but is also useful for catalyzing the reaction of a reactive hydrogen of a secondary hydroxyl group with an organic isocyanate or organic isothiocyanate. Another object of the invention is to provide a catalyst which can be used to advantage to modify the reaction rate beween a compound having reactive hydrogens and either an aliphatic isocyanate or an aromatic isocyanate. Still another object of the invention is to provide a method for preparing polyurethane plastics from any of the various known types of organic compounds having reactive hydrogens and either an aromatic polyisocyanate or aliphatic polyisocyanate. A more specific object of the invention is to provide an improved method for catalyzing the reaction between a reactive hydrogen and an —NCO or —NCS group.

The foregoing objects and others are accomplished in accordance with this invention, generally speaking, by providing a method for reacting an organic compound containing at least one reactive hydrogen with a compound containing at least one —NCX group wherein X is either oxygen or sulfur in the presence of a catalytic amount of thorium salt which is soluble in the reaction mixture such as, for example, a thorium salt of a carboxylic acid having from 1 to 18 carbon atoms or a thorium salt of an inorganic acid. Examples of suitable thorium salts include thorium adipate, thorium acetate, thorium succinate, thorium oleate, thorium isooctylmaleate, thorium stearate, thorium (2-ethyl hexoate), thorium benzoate, thorium nitrate, thorium chloride, thorium iodide, and thorium bromide.

It has now been found that the rate of reaction between a compound having reactive hydrogen and an organic isocyanate or organic isothiocyanate can be modified advantageously by one of the foregoing catalysts even if the reactive hydrogen is contained in a secondary hydroxyl group and the isocyanate or isothiocyanate is an aliphatic compound. Hence, the invention contemplates the catalysis of such reactions and the preparation of polyurethanes from any known organic compounds having reactive hydrogens and organic polyisocyanates or organic polyisothiocyanates.

The amount of catalyst used to modify the reaction between a reactive hydrogen and an —NCS or —NCO group will vary somewhat with the reaction rate desired and with the particular catalyst used. However, generally, it will be within the range of from about 0.1 to about 10 parts by weight of catalyst to 100 parts by weight of the organic compound having reactive hydrogen. However, it is to be understood that all catalytic amounts of the catalyst are broadly contemplated by the invention.

If the catalyst is not readily soluble in the reaction mixture, it may be desirable to dissolve it in an inert solvent therefor which is miscible with the reaction mixture and to introduce the catalyst into the reaction mixture in this manner. Examples of suitable solvents are hydrocarbons, chloro substituted hydrocarbons and the like, such as, for example, dioxan, chlorobenzene, mineral spirits, dichlorobenzene and the like. Mixtures of the various compounds can be used as a catalyst, if desired.

The catalyst provided by this invention will modify the reaction rate between any reactive hydrogen of an organic compound and an organic isocyanate or isothiocyanate. By "reactive hydrogen," as used herein and in the claims, is meant any hydrogen atom determinable by the Zerewitinoff method. An "organic compound having reactive hydrogens" is one having hydrogen atoms determinable by the Zerewitinoff method. This method is described by Kohler et al., J. Am. Chem. Soc. 49, 3181 (1927). Such a reactive hydrogen atom is connected to an oxygen, sulfur or nitrogen atom and is reactive with an —NCO or —NCS group. Examples of suitable compounds include ethyl alcohol, methyl alcohol, ethyl amine, methyl amine, propyl amine, isopropyl alcohol, butyl alcohol, octyl alcohol, ethyl mercaptan, methyl mercaptan, octyl mercaptan or other similar monohydric alcohol, mercaptan or monoprimary amine. Other typical compounds whose reaction with an isocyanate or isothiocyanate may be modified and often made possible with the catalyst of this invention are water, hydrazines, diazoamino compounds, sulfonamides, malonic esters, and the like. The phenol may be either monohydroxybenzene, hydroquinone, or the like. The carboxylic acid may be acetic acid, tartaric acid, propionic acid, terephthalic acid, malonic acid, adipic acid, maleic acid, succinic acid, nondecyclic acid, or the like. Acetamide, γ-butyrolactam, α-pyrazolidine, urea, butyl urea, thiourea, diphenyl carbazide, oximes such as benzaldoxime, dimethyl malonate, ethylene glycol, glycerine, trimethylolpropane, hexamethylene diamine, castor oil, 1,2,6-hexanetriol, furfuryl alcohol, 1,5-naphthalenedimethanol, 3 quinolinebutanol, sorbitol, pentaerythritol and the like are other more specific examples of compounds having reactive hydrogen containing groups of the type contemplated herein.

The invention is particularly advantageous in the preparation of polyurethane plastics. Organic compounds having at least two reactive hydrogens determinable by the Zerewitinoff method are used in the preparation of such plastics. The plastics may be either cellular or a substantially non-porous elastomeric product depending upon the particular reaction conditions utilized.

Any suitable organic compound having hydrogens determinable by the Zerewitinoff method, may be used in accordance with this invention for preparing a polyurethane. Examples of such compounds include polyesters prepared by condensation of a polycarboxylic acid with a polyhydric alcohol. Any suitable polycarboxylic acid and any suitable polyhydric alcohol can be used to make the polyester. Examples of suitable polycarboxylic acids are adipic acid, succinic acid, maleic acid, malonic acid, terephthalic acid, phthalic anhydride, and various other polycarboxylic acids including those disclosed in U.S. Reissue Patent 24,514. Examples of suitable polyhydric alcohols are disclosed in Reissue 24,514 and include ethylene glycol, diethylene glycol, glycerine, trimethylolpropane, 1,2,6-hexanetriol, pentaerythritol and the like. The organic compound having reactive hydrogen atoms used in preparing the polyurethane may be a polyhydric polyether. The polyhydric polyether can be prepared by condensing an alkylene oxide or by condensing an alkylene oxide with a polyhydric alcohol. Any suitable polyhydric alcohol can be used for this purpose such as, for example, ethylene glycol, diethylene glycol, glycerine, trimethylolpropane, pentaerythritol, sorbitol or the like. Any suitable alkylene oxide may be used such as, for example, ethylene oxide, propylene oxide, butylene oxide, amylene oxide or the like. Usually, the lower alkylene oxides are used. The polyether may be either a polyhydric polyalkylene ether having primary alcoholic hydroxyl groups or secondary alcoholic hydroxyl groups. It may contain aromatic radicals such as, for example, one prepared by condensing an alkylene oxide such as propylene oxide with an alcohol prepared by esterifying a polyhydric alcohol such as ethylene glycol and terephthalic acid.

A polythioether prepared by condensing thiodiglycol or other suitable low molecular thiodiglycol may be used. Such polythioethers are disclosed in U.S. Patents, 2,862,972 and 2,900,368.

The compound used with the polycarboxylic acid in preparing the polyester may be an amino alcohol, amine, or a mixture of an amino alcohol or an amine with other polyhydric alcohols in which case the polyester will be a polyester amide. Suitable polyester amides are disclosed in U.S. Patent Reissue 24,514.

A polyacetal prepared by condensing an aldehyde such as formaldehyde, or the like, and an alcohol such as etheyleneglycol, diethylene glycol or the like may also be used.

The polymer of tetrahydrofuran, hydrogenated castor oil and the polymer of an olefin such as ethylene and carbon monoxide have been used in preparing polyurethanes heretofore and can be used in practicing the herein-described invention. Suitable polymers of olefins and carbon monoxide are disclosed in U.S. Patent 2,839,478.

Preferably, the organic compound having at least two reactive hydrogens used in preparing the polyurethane plastics is a liquid at ordinary room temperatures and has an average molecular weight of at least about 200 and an hydroxyl number of not more than about 600. Preferably, the polyester has an acid number of less than 10 and most desirably within the range of 0 to 2. These compounds may have terminal —SH groups along with or instead of —OH groups. For example, the polyester may be prepared from a mercaptan and polycarboxylic acid such as, for example, ethylene mercaptan and adipic acid.

As pointed out hereinbefore, the invention is particularly advantageous in the preparation of the polyurethane plastics from polyols having secondary hydroxyl groups such as, for example, a polyhydric polyoxypropylene such as one prepared by condensing propylene oxide or by condensing propylene oxide with ethylene glycol, glycerine, trimethylolpropane, or the like.

It should be apparent from the foregoing that the invention in its broadest aspects contemplates all reactions between reactive hydrogens as defined herein and an —NCO group or —NCS group regardless of the nuclear structure of the organic compound.

The —NCO group or —NCS group may be on any organic nucleus, aliphatic or aromatic, such as, for example, an aromatic isocyanate, acyclic isocyanate, alicyclic isocyanate or heterocyclic isocyanate or corresponding isothiocyanate. Examples of suitable isocyanates include methyl isocyanate, ethyl isocyanate, propyl isocyanate, butyl isocyanate, hexyl isocyanate, octyl isocyanate, octadecyl isocyanate, eicosyl isocyanate, thienyl isocyanate, tolyl isocyanate, vinyl isocyanate, furfuryl isocyanate, isopropenyl isocyanate, vinylphenyl isocyanate, phenyl isocyanate, benzyl isocyanate and the like. The corresponding isothiocyanates may also be used. In the preparation of polyurethane plastics, any suitable isocyanate having at least two —NCO groups or isothiocyanate having at least two —NCS groups including those disclosed in U.S. Reissue Patent 24,514 may be used. For example, one may use hexamethylene diisocyanate, 2,4-toluylene diisocyanate, 4.4'-diphenylmethane diisocyanate, 4,4'-diphenyl dimethyl methane diisocyanate, 4,4',4''-triphenylmethane triisocyanate, 2,4,6 - triisocyanate - s - triazine, xylylene diisocyanate, 2,6-toluylene diisocyanate, 1,5-naphthalene diisocyanate, 1-methyl 2,4-diisocyanato-5-chlorobenzene, 1 - methyl-2,4-diisocyanato cyclohexane, 1-methyl-2,4-diisocyanato-5-nitrobenzene, m-phenylene diisocyanate, p-phenylene diisocyanate, 1,4-naphthalene diisocyanate, the corresponding polyisothiocyanates, and the like. The dimers, trimers, or other polymers of toluylene diisocyanate or other polyisocyanates or polyisothiocyanates may be used. Moreover, the reaction between adducts having terminal —NCO or —NCS groups such as, for example, a prepolymer prepared by reaction of an excess of toluylene diisocyanate or toluylene diisothiocyanate, or other polyisocyanates or polyisothiocyanates with a polyester, polyhydric polyalkylene ether or the like, may be reacted to advantage with a compound having reactive hydrogen in the presence of one of the catalysts provided by this invention.

In order better to describe and further clarify the invention, the following are specific examples thereof:

*Example I*

About 100 parts by weight of a polyoxypropylene triol having an average molecular weight of about 3000 prepared by condensation of propylene oxide with glycerine and having an hydroxyl content of about 1.7 percent by weight, about 38 parts of a mixture of 80 percent 2,4-toluylene diisocyanate and 20 percent 2,6-toluylene diisocyanate, about 7.5 parts of an activator mixture containing about 2.5 parts thorium nitrate, about 0.5 part 1-methyl-(4 dimethyl amino ethyl) piperazine, about 3 parts water and about 1.5 parts of a stabilizer having the formula

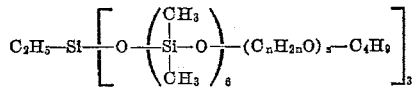

wherein ($C_nH_{2n}O$) represents about 17 oxyethylene units and about 13 oxypropylene units and the value of $z$ is thus about 30, are mixed together substantially simultaneously with an apparatus of the type disclosed in U.S. Patent Reissue 24,514. The diisocyanate and activator mixture are injected into a stream of the polyoxypropylene triol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

Example II

About 100 parts by weight of a polyoxypropylene triol having an average molecular weight of about 3000 prepared by condensation of propylene oxide with glycerine and having an hydroxyl content of about 1.7 percent by weight, about 38 parts of a mixture of 80 percent 2,4-toluylene diisocyanate and 20 percent 2,6-toluylene diisocyanate, about 7.5 parts of an activator mixture containing about 2.5 parts thorium acetate, about 0.5 part 1-methyl-(4 dimethyl amino ethyl) piperazine, about 3 parts water and about 1.5 parts of a stabilizer having the formula

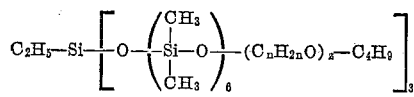

wherein $(C_nH_{2n}O)$ represents about 17 oxyethylene units and about 13 oxypropylene units and the value of $z$ is thus about 30, are mixed together substantially simultaneously with an apparatus of the type disclosed in U.S. Patent Reissue 24,514. The diisocyanate and activator mixture are injected into a stream of the polyoxypropylene triol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

Example III

About 1 part thorium nitrate is suspended in about 9 parts dioxan. About 100 parts by weight of a polyoxypropylene triol prepared by condensing propylene oxide with glycerine and having a molecular weight of about 3000 and an hydroxyl content of about 1.7 percent are added to the dioxan-catalyst mixture. Upon stirring, the catalyst dissolves in the mixture. About 8.7 parts of a mixture of 80 percent 2,4-toluylene diisocyanate and 20 percent 2,6-toluylene diisocyanate are added to the dioxan mixture and the resulting mixture is stirred until a uniform mixture is obtained. The mixture is then heated in a suitable container to a temperature of about 70° C. and gels in about 32 minutes.

In contrast thereto, when a similar mixture, with the exception that the catalyst is omitted, is heated at 70° C. more than 240 minutes are required for gelation. Addition of a β-diketone of thorium does not reduce the time required for gelation of the mixture much below 240 minutes. Gelation is an indication that reaction has occurred between the toluylene diisocyanate and polyoxypropylene triol to form a high molecular weight polymer.

Example IV

About 1 part thorium chloride is suspended in about 9 parts dioxan. About 100 parts by weight of a polyoxypropylene triol prepared by condensing propylene oxide with glycerine and having a molecular weight of about 3000 and an hydroxyl content of about 1.7 percent are added to the dioxan-catalyst mixture. The catalyst dissolves in the mixture. About 8.7 parts of a mixture of 4,4'-diphenylmethane diisocyanate are added to the dioxan mixture and the resulting mixture is stirred until a uniform mixture is obtained. The mixture is then heated in a suitable container to a temperature of about 70° C. and gels in 45 minutes.

Example V

About 1 part thorium bromide is suspended in about 100 parts by weight ethyl alcohol and after complete dissolution of the catalyst, about 8.7 parts phenyl isocyanate are added. Reaction proceeds immediately forming a monourethane.

Example VI

About 1 part thorium acetate is suspended in about 9 parts dioxan. About 100 parts by weight of a polyester prepared by esterifying about 16 mols adipic acid, about 16 mols diethylene glycol and about 1 mol trimethylolpropane are added to the dioxan mixture whereupon the catalyst dissolves. About 8.7 parts by weight 1,5-naphthalene diisocyanate are added to the dioxan mixture and the resulting mixture is stirred until a uniform solution is obtained. The mixture is then heated in a suitable container to a temperature of about 70° C. and gels in 25 minutes.

Example VII

About 1 part thorium adipate is suspended in about 9 parts dioxan. About 100 parts by weight of a polyoxypropylene triol prepared by condensing propylene oxide with glycerine and having a molecular weight of about 3000 and an hydroxyl content of about 1.7 percent are added to the dioxan-catalyst mixture. Upon stirring, the catalyst dissolves in the mixture. About 8.7 parts of a mixture of 80 percent 2,4-toluylene diisocyanate and 20 percent 2,6-toluylene diisocyanate are added to the dioxan mixture and the resulting mixture is stirred until a uniform mixture is obtained. The mixture is then heated in a suitable container to a temperature of about 70° C. and gels in 38 minutes.

Example VIII

About 100 parts by weight of a polyoxypropylene triol prepared by condensing propylene oxide and glycerine and having a molecular weight of about 3000, about 3 parts by weight thorium nitrate and about 9 parts of a mixture containing about 80 percent 2,4-toluylene diisocyanate and about 20 percent 2,6-toluylene diisocyanate are all mixed together simultaneously under substantially anhydrous conditions. The resulting mixture reacts to form a solid, substantially non-porous rubber-like polyurethane. The mixture may be put in a mold before solidification to form a cast elastomer; it may be spread as a sheet; or it may be used for coating a substrate such as, for example, a textile.

Example IX

About 100 parts by weight of the condensation product of propylene oxide and 1,2,6-hexanetriol having an average molecular weight of about 700, and an hydroxyl content of about 6.8 percent by weight and about 36 parts by weight of a mixture of 80 percent 2,4-toluylene diisocyanate and 20 percent 2,6-toluylene diisocyanate are mixed together. The condensation product of 1,2,6-hexanetriol and propylene oxide is prepared by known methods such as, for example, by placing the 1,2,6-hexanetriol and potassium hydroxide in a suitable vessel and adding propylene oxide thereto at a temperature of about 250° C. until the desired molecular weight is obtained. The reaction can be stopped by neutralizing the alkali. About 1 mol hexanetriol is used per 9 mols propylene oxide. About 20 parts methylene chloride are added as a liquid to the reaction mixture of propylene oxide condensate and toluylene diisocyanate; preferably simultaneously with the mixing of the said two reactants. About 4 parts thorium oleate and about 1.5 parts of a stabilizer having the formula

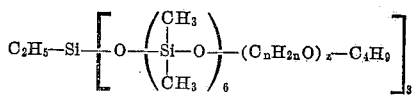

wherein $(C_nH_{2n}O)$ represents about 17 oxyethylene units and about 13 oxypropylene units and $z$ is equal to about 30 are also mixed with the other ingredients substantially simultaneously. The resulting foam will have a density of about 2 pounds per cubic foot with the methylene chloride acting as a blowing agent to produce a cellular structure. The reaction is preferably conducted with a small amount (0.2 part) of water to supplement the blowing action of the methylene chloride by production of carbon dioxide.

Example X

About 100 parts by weight polypropylene ether glycol having a molecular weight of about 2000 and an hydroxyl number of about 56, about 38 parts of a mixture of 80 percent 2,4-toluylene diisocyanate and 20 percent 2,6-toluylene diisocyanate, about 6.2 parts of an activator containing about 1.5 parts thorium (2-ethyl) hexoate, about 0.2 part N,N,N',N'-tetramethyl butylene diamine, about 3 parts water and about 1.5 parts of the compound having the formula

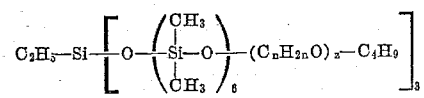

wherein ($C_nH_{2n}O$) represents about 17 oxyethylene units and about 13 oxypropylene units and the value of $z$ is thus about 30, are mixed together substantially simultaneously with an apparatus of the type disclosed in U.S. Patent Reissue 24,514. The diisocyanate and activator mixture are injected into a stream of the polyalkylene ether glycol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

It is to be understood that any of the other organic compounds having reactive hydrogen determinable by the Zerewitinoff method disclosed as suitable herein may be substituted for the particular compound used in the foregoing examples. Likewise, any of the other organic isocyanates or organic isothiocyanates can be substituted for the particular one used in the foregoing examples. Moreover, any of the other embodiments of the catalyst disclosed herein, can be substituted for the particular embodiments used in each example.

Preferably, when making a cellular polyurethane, a tertiary amine is included with the novel metal catalyst provided by this invention. The tertiary amine may be any suitable tertiary amine known to catalyze a reaction between an —NCO group and water. Examples of such tertiary amines include 1-methyl-4-(dimethyl amino ethyl) piperazine, 1-ethyl-4-(diethyl amino ethyl) piperazine, 1-butyl-4-(dibutyl amino ethyl) piperazine, triethylene diamine, N,N,N',N'-tetramethyl butylene diamine, N-methyl morpholine, N-ethyl morpholine and the like. Moreover, the catalyst mixture might contain in addition to the novel catalyst provided herein, in a tin salt such as, for example, dibutyl tin di-(2-ethyl hexoate), stannous chloride, stannous oleate, stannous octoate and the like.

Any amount of organic isocyanate or isothiocyanate is contemplated herein because the catalysis will occur with any amount of —NCO or —NCS groups and reactive hydrogen present. In preparing a polyurethane, it is preferred to use an excess of organic polyisocyanate over that required to react with all of the reactive hydrogen of the organic compound having reactive hydrogen and a molecular weight of at least about 200. Preferably, the number of —NCX groups will be about equal to the sum of the reactive hydrogens of the organic compound having a molecular weight of at least about 200 and the reactive hydrogens of the water or other cross-linker such as ethylene diamine, ethylene glycol or the like. Seldom will more than an average of about 2.5 —NCX groups per reactive hydrogen of the organic compound having a molecular weight of at least about 200 be required.

In making a cellular polyurethane a foam stabilizer is preferably included in the reaction mixture. A dialkyl siloxane such as dimethyl siloxane can be used particularly if the organic compound having reactive hydrogen is a polyester. It is preferred with polyhydric polyalkylene ethers to use a siloxane oxyalkylene block copolymer having the formula

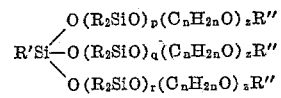

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene block containing from 15 to 19 oxyethylene units and from 11 to 15 oxypropylene units with $z$ equal to from about 26 to about 34 or similar stabilizer so a process which combines the catalyst provided by this invention and stabilizer is contemplated by the invention as a preferred embodiment. Compounds represented by the formula and a method for making them are disclosed in U.S. Patent 2,834,748.

The reaction between a reactive hydrogen and an —NCX group in the presence of the catalyst provided by this invention may be conducted at any suitable temperature. Most convenient temperatures at the time of mixing are room temperatures of about 20° C. but elevated temperatures may be used. Usually in preparing polyurethanes, the reactants and other components of the reaction mixture are mixed together at room temperature. The reaction is exothermic so the temperature of the reaction mixtures rises quickly up to 100° C. or more as a polyurethane is formed.

The polyurethanes prepared by the process provided herein can be used in making vehicle tires, cushions, sponges, carpet underlay, machine parts such as bearings, or the like.

As indicated in one of the foregoing examples, a cellular product can be produced under substantially anhydrous conditions if a blowing agent which is a gas at the reaction temperatures is included in the reaction mixture. Trichlorofluoromethane, methylene chloride, air and the like can be used for this purpose. For best results, water as well as one of these blowing agents is used.

Best results are obtained in making a cellular polyurethane with water alone when from about 0.5 to about 5 parts water per 100 parts organic compound having reactive hydrogens and a molecular weight of at least about 200 are used. If an anhydrous blowing agent alone is used, from about 5 to 35 parts per 100 parts organic compound having reactive hydrogens and a molecular weight of at least 200 are used.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. In the preparation of polyurethanes and polythiourethanes by a process in which an organic compound having at least two reactive hydrogen atoms determinable by the Zerewitinoff method, a molecular weight of at least about 200, an —OH number of not more than about 600 and an acid number of less than 10 with an organic compound having at least two —NCX groups, wherein X is selected from the group consisting of oxygen and sulfur, the improvement which comprises conducting the reaction in the presence of a catalytic amount of a catalyst containing a member selected from the group consisting of a thorium salt of a carboxylic acid having from 1 to 18 carbon atoms and a thorium salt of an inorganic acid soluble in the reaction mixture.

2. The process of claim 1 wherein the catalyst contains a mixture of at least one of the catalysts of claim 1 and a tertiary amine.

3. The process of claim 2 wherein the reaction mixture contains a compound having the formula

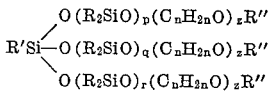

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene block containing from 15 to 19 oxyethylene units and from 11 to 15 oxypropylene units with $z$ equal to from about 26 to about 34 and the product is a cellular polyurethane.

4. The process of claim 3 wherein the catalyst is a mixture of thorium nitrate and a tertiary amine.

5. The process of claim 3 wherein the reaction mixture contains water.

6. The process of claim 3 wherein the organic compound having reactive hydrogen is a polyhydric polyalkylene ether.

7. The process of claim 5 wherein the organic compound having reactive hydrogen is a polyhydric polyalkylene ether and all of the reactants are mixed together substantially, simultaneously.

8. The process of claim 7 wherein the polyhydric polyalkylene ether is a polyhydric polypropylene ether.

9. The process of claim 1 wherein X in the formula —NCX is oxygen and a polyurethane is prepared.

References Cited in the file of this patent
UNITED STATES PATENTS

| | | |
|---|---|---|
| 2,933,462 | Fischer | Apr. 19, 1960 |
| 2,990,244 | Brown et al. | June 27, 1961 |